(12) United States Patent
Aiki et al.

(10) Patent No.: US 7,897,711 B2
(45) Date of Patent: *Mar. 1, 2011

(54) ORGANIC-INORGANIC HYBRID COMPOSITION, METHOD FOR PRODUCING THE SAME, MOLDING AND OPTICAL COMPONENT

(75) Inventors: Yasuhiro Aiki, Kanagawa (JP);
Tatsuhiko Obayashi, Kanagawa (JP);
Hiroaki Mochizuki, Kanagawa (JP);
Ryo Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 124 days.

This patent is subject to a terminal disclaimer.

(21) Appl. No.: 12/278,160

(22) PCT Filed: Feb. 9, 2007

(86) PCT No.: PCT/JP2007/052798
§ 371 (c)(1),
(2), (4) Date: Aug. 4, 2008

(87) PCT Pub. No.: WO2007/091734
PCT Pub. Date: Aug. 16, 2007

(65) Prior Publication Data
US 2009/0035548 A1 Feb. 5, 2009

(30) Foreign Application Priority Data
Feb. 10, 2006 (JP) .................................. 2006-033758

(51) Int. Cl.
*C08G 77/00* (2006.01)
(52) U.S. Cl. ............ 528/10; 526/277; 526/287; 526/318; 524/413
(58) Field of Classification Search ............ 528/10
See application file for complete search history.

(56) References Cited

U.S. PATENT DOCUMENTS

| 3,577,480 A * | 5/1971 | Thorpe .................... 523/516 |
| 2002/0128502 A1 | 9/2002 | Su et al. |
| 2009/0017280 A1* | 1/2009 | Suzuki et al. .............. 428/220 |

FOREIGN PATENT DOCUMENTS

| EP | 0661558 A1 | 7/1995 |
| JP | 09-113701 A | 5/1997 |
| JP | 09-188796 A | 7/1997 |
| JP | 2001-164119 A | 6/2001 |
| JP | 2003-055517 A | 2/2003 |
| JP | 2003073559 A * | 3/2003 |
| JP | 2003073563 A * | 3/2003 |
| JP | 2005-314661 A | 11/2005 |
| JP | 2006-169347 A | 6/2006 |
| JP | 2006-225632 A | 8/2006 |
| WO | WO 03/013846 A1 | 2/2003 |
| WO | WO 03013846 A1 * | 2/2003 |

OTHER PUBLICATIONS

LACTEL Absorbably Polymers.*
Lee, Long-Hua et al., High Refractive-Index Thin Films Prepared From Trialkoxysilane-Capped Poly(methylmethacrylate)—Titania Materials, Department of Chemical Engineering, National Taiwan University, Taipei, Taiwan, Chemical Mater. 2001, 13 pp. 1137-1142.
Extended European Search Report for EPA No. 07714328.7 dated Oct. 23, 2009.

* cited by examiner

*Primary Examiner* — Randy Gulakowski
*Assistant Examiner* — Lindsay Nelson
(74) *Attorney, Agent, or Firm* — Sughrue Mion, PLLC

(57) ABSTRACT

An organic-inorganic hybrid composition comprising inorganic fine particles and a thermoplastic resin having a functional group capable of forming a chemical bond with the inorganic fine particles at a side chain thereof, the composition having a refractive index of 1.60 or more at a wavelength of 589 nm and a light transmittance of 70% or more at a wavelength of 589 nm in terms of the composition having a thickness of 1 mm. The composition has high refraction properties and excellent transparency.

37 Claims, No Drawings

US 7,897,711 B2

ORGANIC-INORGANIC HYBRID COMPOSITION, METHOD FOR PRODUCING THE SAME, MOLDING AND OPTICAL COMPONENT

TECHNICAL FIELD

The present invention relates to an organic-inorganic hybrid composition having excellent high refraction properties, transparency, lightweight properties and workability, and an optical component such as a lens substrate that is constructed to include the organic-inorganic hybrid composition (e.g., lenses to constitute eyeglasses, lenses for optical instruments, lenses for optoelectronics, lenses for lasers, lenses for pickups, lenses for in-vehicle cameras, lenses for portable cameras, lenses for digital cameras, lenses for OHP and microlens arrays).

BACKGROUND ART

Optical materials are much studied these days, and especially in the field of lenses, it is strongly desired to develop materials having high refraction properties, heat resistance, transparency, easy moldability, lightweight properties, chemical resistance and solvent resistance.

As compared with inorganic materials such as glass, plastic lenses are lightweight and are hardly cracked, and they can be worked into various shapes. Accordingly, these days, they are being much popularized not only for eyeglass lenses but also for other various optical materials such as lenses for portable cameras and pickup lenses.

With that, the plastic material itself for lenses is desired to have high refractive index for obtaining thin lenses and downsized pickup devices. For example, a technique of introducing a sulfur atom into a polymer (see JP-A-2002-131502 and JP-A-10-298287), and a technique of introducing a halogen atom and an aromatic ring into a polymer (see JP-A-2004-244444) are being much studied. However, a plastic material having high refractive index and having good transparency so as to be substitute for glass is not as yet developed. Further, in optical fibers and optical waveguides, materials having different refractive indexes are used in combination, or a material having distributed refractive index is used. Thus, to provide a material having different refractive index by sites, development of a technique that can optionally control a refractive index is desired.

From that it is difficult to increase a refractive index with only an organic material, a technique of increasing a refractive index of a resin by dispersing an inorganic material having high refractive index in a resin matrix is reported (see JP-A-2003-73559). To reduce transmitted light attenuation due to Rayleigh scattering, it is preferable to uniformly disperse inorganic fine particles having a particle size of 15 nm or less in a resin matrix. However, primary particles having a particle size of 15 nm or less are very liable to agglomerate, and therefore, it is extremely difficult to uniformly disperse those in a rein matrix. Further, considering transmitted light attenuation in optical path length corresponding to a thickness of a lens, the amount of inorganic fine particles added must be limited. For this reason, it has not hitherto been realized to disperse fine particles in a resin matrix in high concentration without deteriorating transparency of a resin.

A resin composition molding which is a molding mainly comprising a thermoplastic resin composition having dispersed therein ultrafine particles having a number average particle size of from 0.5 to 50 nm and has a birefringence per 1 mm optical path length of 10 nm or less on the average (see JP-A-2003-147090), or a thermoplastic material resin composition comprising a thermoplastic resin having a refractive index shown by a specific equation and Abbe number and inorganic fine particle having specific average particle diameter and refractive index, and an optical component using the composition are reported (see JP-A-2003-73563 and JP-A-2003-73564). Those are that inorganic fine particles are dispersed in a resin, but any of those did not exhibit sufficient performances from the standpoint that fine particles are dispersed in a resin matrix in high concentration without deteriorating transparency of a resin.

A technique relating to a composition in which inorganic fine particles are dispersed in a resin having a functional group such as a carboxyl group introduced in a side chain is disclosed in JP-T-2004-524396, JP-A-2004-217714 and JP-T-2004-352975 (the term "JP-T" as used herein means a published Japanese translation of a PCT patent application), but those Patent Documents do not contain the disclosure relating to a thick transparent molding that can be used in a lens of high refractive index.

DISCLOSURE OF THE INVENTION

As described above, a material composition that has high refraction properties, transparency and lightweight properties in combination, and further can optionally control a refractive index, and an optical component constructed to include the same are not yet found, and its development is desired.

The invention is made in view of the above actual situation, and its object is to provide an organic-inorganic hybrid composition having excellent transparency and high refractive index, comprising a resin matrix and fine particles uniformly dispersed therein, and an optical component such as a lens substrate using the composition.

As a result of keen investigations to achieve the above object, the present inventors have found that a composition using specific resin and inorganic fine particles as raw materials has excellent transparency by uniform dispersion effect of the fine particles, and have reached to complete the invention.

[1] An organic-inorganic hybrid composition comprising inorganic fine particles and a thermoplastic resin having a functional group capable of forming a chemical bond with the inorganic fine particles at a side chain thereof, the composition having a refractive index of 1.60 or more at a wavelength of 589 nm and a light transmittance of 70% or more at a wavelength of 589 nm in terms of the composition having a thickness of 1 mm.

[2] The organic-inorganic hybrid composition of [1], wherein the functional group of the thermoplastic resin is selected from the group consisting of

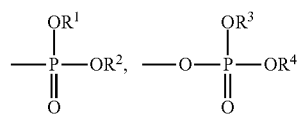

wherein $R^1$, $R^2$, $R^3$ and $R^4$ each independently represent a hydrogen atom, a substituted or unsubstituted alkyl group, a substituted or unsubstituted alkenyl group, a substituted or unsubstituted alkynyl group or a substituted or unsubstituted aryl group; $-SO_3H$, $-OSO_3H$, $-CO_2H$, a metal alkoxide group, $-OH$, $-NH_2$ and $-SH$.

[3] The organic-inorganic hybrid composition of [2], wherein the functional group of the thermoplastic resin is selected from the group consisting of

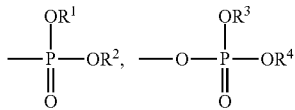

wherein $R^1$, $R^2$, $R^3$ and $R^4$ each independently represent a hydrogen atom, a substituted or unsubstituted alkyl group, a substituted or unsubstituted alkenyl group, a substituted or unsubstituted alkynyl group or a substituted or unsubstituted aryl group; —$CO_2H$, —$SO_3H$ or —$Si(OR^5)_m R^6{}_{3-m}$, wherein $R^5$ and $R^6$ each independently represent a hydrogen atom, a substituted or unsubstituted alkyl group, a substituted or unsubstituted alkenyl group, a substituted or unsubstituted alkynyl group or a substituted or unsubstituted aryl group, and m is an integer of 0 to 3.

[4] The organic-inorganic hybrid composition of any one of [1] to [3], wherein the functional group is contained in a range of from 0.1 to 20 on the average per one polymer chain of the thermoplastic resin.

[5] The organic-inorganic hybrid composition of any one of [1] to [4], wherein the thermoplastic resin is a copolymer containing a repeating unit represented by the following formula (1):

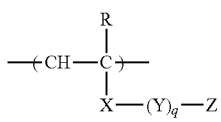

Formula (1)

wherein R represents a hydrogen atom, a halogen atom or a methyl group; X represents a divalent linking group selected from —$CO_2$—, —OCO—, —CONH—, —OCONH—, —OCOO—, —O—, —S—, —NH—and a substituted or unsubstituted arylene group; Y represents a divalent linking group having from 1 to 30 carbon atoms; q is an integer of from 0 to 18; Z represents a functional group selected from the group consisting of

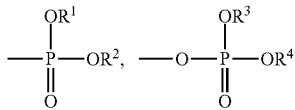

—$SO_3H$, —$CO_2H$ and —$Si(OR^5)_m R^6{}_{3-m}$, wherein $R^1$, $R^2$, $R^3$, $R^4$, $R^5$ and $R^6$ each independently represent a hydrogen atom, a substituted or unsubstituted alkyl group, a substituted or unsubstituted alkenyl group, a substituted or unsubstituted alkynyl group and a substituted or unsubstituted aryl group, and m is an integer of 0 to 3.

[6] The organic-inorganic hybrid composition of any one of [1] to [5], wherein the thermoplastic resin has a weight average molecular weight of from 1,000 to 500,000.

[7] The organic-inorganic hybrid composition of any one of [1] to [6], wherein the thermoplastic resin has a refractive index of 1.55 or more.

[8] The organic-inorganic hybrid composition of any one of [1] to [7], wherein the inorganic fine particles are metal oxide fine particles having a refractive index of from 1.9 to 3.0 at a wavelength of 589 nm.

[9] The organic-inorganic hybrid composition of any one of [1] to [8], wherein the inorganic fine particles contain zirconium oxide, zinc oxide or titanium oxide.

[10] The organic-inorganic hybrid composition of any one of [1] to [9], wherein the inorganic fine particles have a number average particle size of from 1 to 15 nm.

[11] The organic-inorganic hybrid composition of any one of [1] to [10], wherein the inorganic fine particles are contained in an amount of 20% by mass or more.

[12] The organic-inorganic hybrid composition of any one of [1] to [11], which is thermoplastic.

[13] The organic-inorganic hybrid composition of any one of [1] to [12], which is a solvent-free solid.

[14] A method for producing an organic-inorganic hybrid composition, comprising mixing a thermoplastic resin having at a side chain thereof a functional group selected from the group consisting of

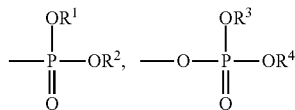

—$SO_3H$, —$CO_2H$ and —$Si(OR^5)_m R^6{}_{3-m}$, wherein $R^1$, $R^2$, $R^3$, $R^4$, $R^5$ and $R^6$ each independently represent a hydrogen atom, a substituted or unsubstituted alkyl group, a substituted or unsubstituted alkenyl group, a substituted or unsubstituted alkynyl group and a substituted or unsubstituted aryl group, and m is an integer of 1 to 3;
and inorganic fine particles in an organic solvent.

[15] The method for producing an organic-inorganic hybrid composition of [14], which comprises subjecting the inorganic fine particles to surface treatment in water, an alcohol or a mixture of water and an alcohol in the presence of a surface-treating agent, extracting the surface-treated inorganic fine particles in an organic solvent, and mixing the extracted inorganic fine particles and the thermoplastic resin having the functional group at a side chain thereof.

[16] The method for producing an organic-inorganic hybrid composition of [14] or [15], which comprises mixing an organic solvent dispersion of the inorganic fine particles and the thermoplastic resin having the functional group at a side chain thereof, and distilling away a solvent from the resulting mixed liquid.

[17] Method for producing an organic-inorganic hybrid composition of [14] or [15], which comprises mixing an organic solvent dispersion of the inorganic fine particles and the thermoplastic resin having the functional group at a side chain thereof, and reprecipitating the mixed liquid.

[18] An organic-inorganic hybrid composition produced by the production method of any one of [14] to [17].

[19] A molding comprising the organic-inorganic hybrid composition of any one of [1] to [13] and [18].

[20] A molding comprising inorganic fine particles and a thermoplastic resin having a functional group capable of bonding to the inorganic fine particles at a side chain thereof, the molding having a refractive index of 1.60 or more at a wavelength of 589 nm and a light transmittance of 70% or more at a wavelength of 589 nm in terms of the molding having a thickness of 1 mm.

[21] The molding of [19] or [20] having a maximum thickness of 0.1 mm or more.

[22] An optical component comprising the molding of [20] or [21].

[23] The optical component of [22], which is a lens substrate.

According to the invention, an organic-inorganic hybrid composition achieving high refractive index without deteriorating transparency of a resin can be provided. Further, because the organic-inorganic hybrid composition of the invention has thermoplasticity, it can easily be molded into a molding such as an optical component including a lens substrate. The molding using the organic-inorganic hybrid composition of the invention has high refractive index while maintaining excellent transparency.

BEST MODE FOR CARRYING OUT THE INVENTION

The organic-inorganic hybrid composition and the molding such as a lens substrate constructed to include the same, of the invention are described in detail below. The description of the constitutive elements described hereinafter is based on the representative embodiment of the invention, and the invention should not be limited to such an embodiment. In the description, the numerical range expressed by the wording "from a number to another number" means the range that falls between the former number indicating the lower limit of the range and the latter number indicating the upper limit thereof.

[Organic-Inorganic Hybrid Composition]

The organic-inorganic hybrid composition of the invention comprises inorganic fine particles and a thermoplastic resin having a functional group capable of forming a chemical bond with the inorganic fine particles at a side chain thereof, and has a refractive index of 1.60 or more at a wavelength of 589 nm and a light transmittance of 70% or more at a wavelength of 589 nm in terms of the composition having a thickness of 1 mm. The organic-inorganic hybrid composition of the invention is used for the production of the molding of the invention described hereinafter.

The organic-inorganic hybrid composition of the invention is preferable solid. Solvent content is preferably 5% by mass or less, more preferably 2% by mass or less, and further preferably 1% by mass or less, and it is most preferable to be solvent-free.

The organic-inorganic hybrid composition of the invention has a refractive index of preferably 1.60 or more, more preferably 1.63 or more, further preferably 1.65 or more, and particularly preferably 1.67 or more, at a wavelength of 589 nm.

The organic-inorganic hybrid composition of the invention has a light transmittance of preferably 70% or more, more preferably 75% or more, and particularly preferably 80% or more, at a wavelength of 589 nm in terms of the composition having a thickness of 1 mm. Further, the light transmittance at a wavelength of 405 nm in terms of the composition having a thickness of 1 mm is preferably 60% or more, more preferably 65% or more, and particularly preferably 70% or more. When the light transmittance at a wavelength of 589 nm in terms of the composition having a thickness of 1 mm is 70% or more, a lens substrate having further preferable properties is liable to obtain. The light transmittance in terms of 1 mm thickness conversion in the invention is a value measured as follows. An organic-inorganic hybrid composition is molded to prepare a substrate having a thickness of 1.0 mm, and a light transmittance of the substrate is measured with a UV-visible ray spectrometric device (UV-3100, a product of Shimadzu Corporation).

The organic-inorganic hybrid composition of the invention has a glass transition temperature of preferably from 100 to 400° C., and more preferably from 130 to 380° C. When the glass transition temperature is 100° C. or higher, there is the tendency that sufficient heat resistance is liable to be obtained, and when the glass transition temperature is 400° C. or lower, there is the tendency that it is liable to conduct processing.

The thermoplastic resin and inorganic fine particles that are the essential constitutive components of the organic-inorganic hybrid composition of the invention are successively described below. The organic-inorganic hybrid composition of the invention may contain additives such as resins that do not satisfy the requirements of the invention, dispersants, plasticizers and release agents, other than those essential constitutive components.

[Thermoplastic Resin]

The organic-inorganic hybrid composition of the invention contains a thermoplastic resin having a functional group capable of forming a chemical bond with the inorganic fine particles at a side chain thereof.

A basic skeleton of the thermoplastic resin used in the invention is not particularly limited, and conventional resin skeletons such as poly(meth)acrylic acid ester, polystyrene, polyvinyl carbazole, polyacrylate, polycarbonate, polyurethane, polyimide, polyester, polyether sulfone, polyether ketone and polythioether can be employed. A vinyl polymer, a polyacrylate and an aromatic group-containing polycarbonate are preferable, and a vinyl polymer is more preferable.

The thermoplastic resin used in the invention has a functional group capable of forming a chemical bond with the inorganic fine particles at a side chain. The "chemical bond" used herein includes a covalent bond, an ionic bond, a coordinate bond and a hydrogen bond. Where plural functional groups are present, those may form different chemical bonds with the inorganic fine particles, respectively. Whether a chemical bond can be formed is determined by whether the functional group of the thermoplastic resin can form a chemical bond with the inorganic fine particles when the thermoplastic resin and the inorganic fine particles are mixed in an organic solvent as described in the Examples described hereinafter. In the organic-inorganic hybrid composition of the invention, the functional groups of the thermoplastic resin all may form a chemical bond with the inorganic fine particles, and part thereof may form a chemical bond with the inorganic fine particles.

The functional group capable of bonding to the inorganic fine particles at a side chain has a function to stably disperse the inorganic fine particles in the thermoplastic resin by forming a chemical bond with the inorganic fine particles. The functional group capable of forming a chemical bond with the inorganic fine particles is not particularly limited in its structure so far as it can form a chemical bond with the inorganic fine particles. For example,

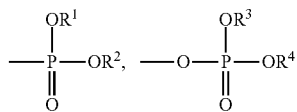

—$SO_3H$, —$OSO_3H$, —$CO_2H$, a metal alkoxide group (preferably —$Si(OR^5)_m R^6_{3-m}$), —OH, —$NH_2$, —SH and the like are exemplified. Of those,

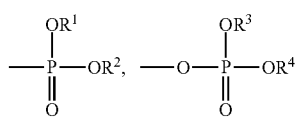

—$SO_3H$, —$CO_2H$ or —$Si(OR^5)_m R^6_{3-m}$ is preferable;

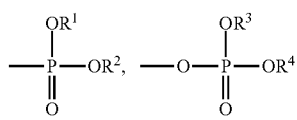

or —CO$_2$H is more preferable; and

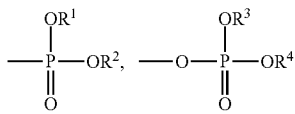

is particularly preferable.

In the above formulae, R$^1$, R$^2$, R$^3$, R$^4$, R$^5$ and R$^6$ each independently represent a hydrogen atom, a substituted or unsubstituted alkyl group, a substituted or unsubstituted alkenyl group, a substituted or unsubstituted alkynyl group or a substituted or unsubstituted aryl group. The alkyl group has preferably from 1 to 30 carbon atoms, and more preferably from 1 to 20 carbon atoms, and examples thereof include a methyl group, an ethyl group and an n-propyl group. The substituted alkyl group includes an aralkyl group. The aralkyl group has preferably from 7 to 30 carbon atoms, and more preferably from 7 to 20 carbon atoms, and examples thereof include a benzyl group and a p-methoxybenzyl group. The alkenyl group has preferably from 2 to 30 carbon atoms, and more preferably from 2 to 20 carbon atoms, and examples thereof include a vinyl group and a 2-phenylethenyl group. The alkynyl group has preferably from 2 to 20 carbon atoms, and more preferably from 2 to 10 carbon atoms, and examples thereof include an ethynyl group and a 2-phenylethynyl group. The aryl group has preferably from 6 to 30 carbon atoms, and more preferably from 6to 20 carbon atoms, and examples thereof include a phenyl group, a 2,4,6-tribromophenyl group and a 1-naphthyl group. The aryl group used herein includes a heteroaryl group. Examples of the substituent for the alkyl group, alkenyl group, alkynyl group and aryl group include a halogen atom (for example, a fluorine atom, a chlorine atom, a bromine atom and an iodine atom), and an alkoxy group (for example, a methoxy group and an ethoxy group), in addition to those alkyl group, alkenyl group, alkynyl group and aryl group. R$^1$, R$^2$, R$^3$, R$^4$, R$^5$ and R$^6$ are particularly preferably a hydrogen atom.

m is an integer of from 0 to 3, and preferably 3.

A method of introducing the functional group into the side chain of the thermoplastic resin is not particularly limited. Examples of the method include a method of copolymerizing a monomer having a functional group, a method of copolymerizing a monomer having a functional group precursor site (for example, ester) and then converting into a functional group by a method such as hydrolysis, and a method of synthesizing a precursor resin having a reactive site such as a hydroxyl group, an amino group or an aromatic ring, and then introducing a functional group into the reactive site. A method of copolymerizing a monomer having a functional group is preferable.

The thermoplastic resin used in the invention is particularly preferably a copolymer having a repeating unit represented by the following formula (1). Such a copolymer can be obtained by copolymerizing a vinyl monomer represented by the following formula (2).

Formula (1)

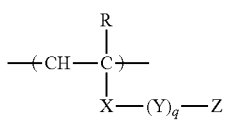

Formula (2)

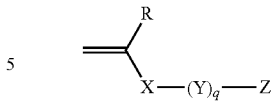

In the formulae (1) and (2), R represents a hydrogen atom, a halogen atom or a methyl group, and X represents a divalent linking group selected from the group consisting of —CO$_2$—, —OCO—, —CONH—, —OCONH—, —OCOO—, —O—, —S—, —NH— and a substituted or unsubstituted arylene group, with —CO$_2$— or a p-phenylene group being more preferable.

Y represents a divalent linking group having from 1 to 30 carbon atoms. The number of carbon atoms is preferably from 1 to 20, more preferably from 2 to 10, and further preferably from 2 to 5. Specific examples of Y include an alkylene group, an alkyleneoxy group, an alkylenecarbonyl group, an arylene, aryleneoxy group, an aryleneoxycarbonyl group and a group combining those, and an alkylene group is preferable.

q is an integer of from 0 to 18. q is an integer of more preferably from 0 to 10, further preferably from 0 to 5, and particularly preferably 0 or 1.

Z represents a functional group selected from the group consisting of

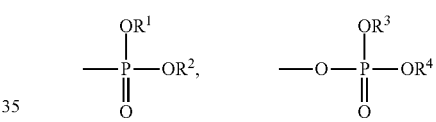

—SO$_3$H, —CO$_2$H and —Si (OR$^5$)$_m$R$^6_{3-m}$.

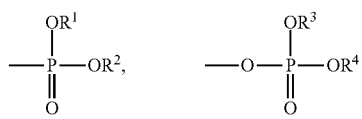

are preferable, and

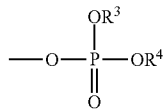

is further preferable.

The definition and specific examples of R$^1$, R$^2$, R$^3$, R$^4$, R$^5$, R$^6$ and m are the same as the definition and specific examples of R$^1$, R$^2$, R$^3$, R$^4$, R$^5$, R6 and m described in the item of the functional group capable of forming a chemical bond with the inorganic fine particles. However, preferable R$^1$, R$^2$, R$^3$, R$^4$, R$^5$ and R$^6$ are a hydrogen atom or an alkyl group.

Specific examples of the monomer represented by the formula (2) are described below, but the monomer that can be used in the invention is not limited to those.

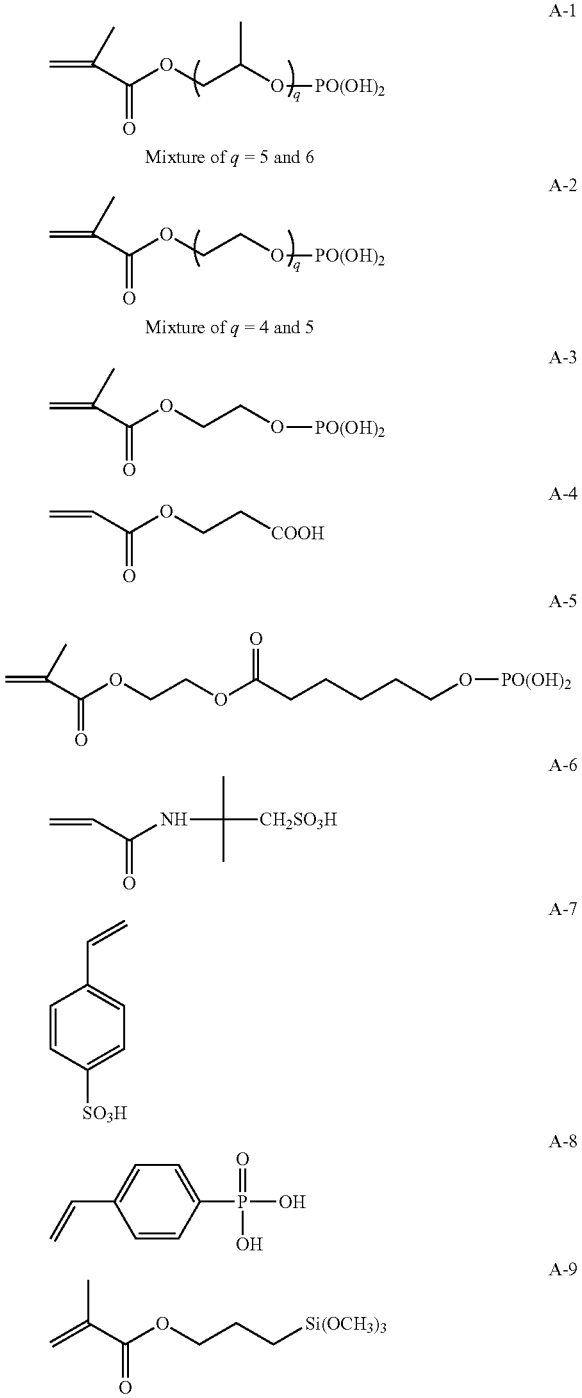

Other kinds of monomers copolymerizable with the monomer represented by the formula (2) in the invention can use the monomers described in Polymer Handbook, 2nd ed., J. Brandrup, Wiley Interscience (1975) Chapter 2, pages 1-483.

Specifically, compounds having one addition-polymerizable unsaturated bond selected from styrene derivatives, 1-vinylnapphthalene, 2-vinylnaphthalene, vinylcarbazole, acrylic acid esters, methacrylic acid esters, acrylamides, methacrylamides, allyl compounds, vinyl ethers, vinyl esters, dialkyl itaconates, dialkyl esters or monoalkyl esters of fumaric acid, and the like can be exemplified.

Examples of the styrene derivatives include styrene, 2,4,6-tribromostyrene and 2-phenylstyrene.

Examples of the acrylic acid esters include methyl acrylate, ethyl acrylate, propyl acrylate, n-butyl acrylate, tert-butyl acrylate, chloroethyl acrylate, 2-hydroxyethyl acrylate, trimethylolpropane monoacrylate, benzyl acrylate, benzyl methacrylate, methoxybenzyl acrylate, furfuryl acrylate, tetrahydrofurfuryl acrylate and 2-phenyphenyl acrylate.

Examples of the methacrylic acid esters include methyl methacrylate, ethyl methacrylate, propyl methacrylate, butyl methacrylate, t-butylmethacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate, and 2-phenylphenyl methacrylate.

Examples of the acrylamides include acrylamide, N-alkyl acrylamide (as the alkyl group, an alkyl group having from 1 to 3 carbon atoms, such as a methyl group, an ethyl group and a propyl group), N,N-dialkyl acrylamide (as the alkyl group, an alkyl group having from 1 to 6 carbon atoms), N-hydroxyethyl-N-methyl acrylamide and N-2-acetamideethyl-N-acetyl acrylamide.

Examples of the methacrylamides include methacrylamide, N-aklyl methacrylamide (as the alkyl group, an alkyl group having from 1 to 3 carbon atoms, such as a methyl group, an ethyl group and a propyl group), N,N-dialkyl methacrylamide (as the alkyl group, an alkyl group having from 1 to 6 carbon atoms), N-hydroxyethyl-N-methyl methacrylamide and N-2-acetamideethyl-N-acetyl methacrylamide.

Examples of the allyl compounds include allyl esters (for example, allyl acetate, allyl caproate, allyl caprate, allyl laurate, allylpalmitate, allyl stearate, allylbenzoate, allyl acetoacetate and allyl lactate), and allyl oxyethanol.

Examples of the vinyl ethers include alkyl vinyl ethers (as the alkyl, an alkyl having from 1 to 10 carbon atoms), such as hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether and tetrahydrofurfuryl vinyl ether).

Examples of the vinyl esters include vinyl butyrate, vinyl isobutyrate, vinyl trimethyl acetate, vinyl diethyl acetate, vinyl pivalate, vinyl caproate, vinyl chloroacetate, vinyl dichloroacetate, vinyl methoxyacetate, vinyl butoxyacetate, vinyl lactoate, vinyl-β-phenyl butylate and vinyl cyclohexyl carboxylate.

Examples of the dialkyl itaconates include dimethyl itaconate, diethyl itaconate and dibutyl itaconate. Examples of dialkyl esters or monoalkyl esters of the fumaric acid include dibutyl fumarate.

Besides those, crotonic acid, itaconic acid, acrylonitrile, methacrylonitrile, maleironitrile and the like can be exemplified.

The thermoplastic resin (disperse polymer) used in the invention has a weight average molecular weight of preferably from 1,000 to 500,000, more preferably from 3,000 to 300,000, and particularly preferably from 10,000 to 100,000. Where the weight average molecular weight of the thermoplastic resin is larger than 500,000, processability of the resin deteriorates, and where it is less than 1,000, an organic-inorganic hybrid composition having sufficient mechanical strength cannot be obtained.

The "weight average molecular weight" used herein is a molecular weight in terms of a polystyrene conversion by detection of a differential refractometer (solvent: hydroquinone) with GPC analyzer using columns of TSK gel GMHxL, TSK gel G4000HxL and TSK gel G2000HxL, products of Tosoh Corporation.

In the thermoplastic resin used in the invention, the content of the functional group that bonds to the inorganic fine particles is preferably from 0.1 to 20, more preferably from 0.5 to 10, and particularly preferably from 1 to 5, on the average per one polymer chain. When the content of the functional group is 20 or less on the average per one polymer chain, the thermoplastic resin coordinates to plural inorganic fine particles, and there is the tendency that it is liable to prevent high viscosity increase and gelation from being generated in a solution state. Further, when the number of the functional group per one polymer chain is 0.1 or more on the average, there is the tendency that the inorganic fine particles are liable to be dispersed stably.

The thermoplastic resin used in the invention has a glass transition temperature of preferably from 80 to 400° C., and more preferably from 130 to 380° C. When a resin having a glass transition temperature of 80° C. or higher is used, an optical component having sufficient heat resistance is liable to be obtained. Further, when a resin having a glass transition temperature of 400° C. or lower is used, there is the tendency that processing is liable to conduct.

Where difference between a refractive index of the thermoplastic resin and a refractive index of the inorganic fine particles is large, Rayleih scattering is liable to occur, and as a result, the amount of the fine particles that can be present in the composite while maintaining transparency is small. When the refractive index of the thermoplastic resin is about 1.48, a transparent molding having a refractive index in a level of 1.60 can be provided, but to realize a refractive index of 1.65 or more, the refractive index of the thermoplastic resin used in the invention is preferably 1.55 or more, and more preferably 1.58 or more. Those refractive indexes are a value at a wavelength of 589 nm at 22° C.

The thermoplastic resin used in the invention has a light transmittance of preferably 80% or more, more preferably 85% or more, and particularly preferably 88% or more, at a wavelength of 589 nm in terms of the resin having a thickness of 1 mm.

Preferable examples of the thermoplastic resin that can be used in the invention are described below, but the thermoplastic resin that can be used in the invention is not limited to those.

B-1

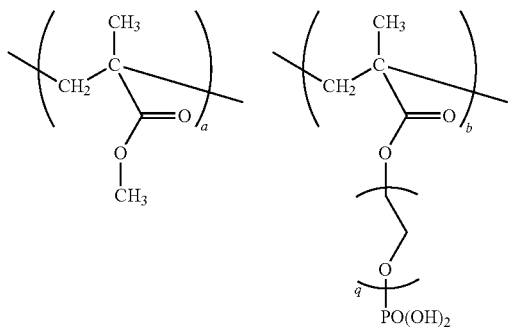

Mixture of $q = 4$ and $5$

-continued

B-2

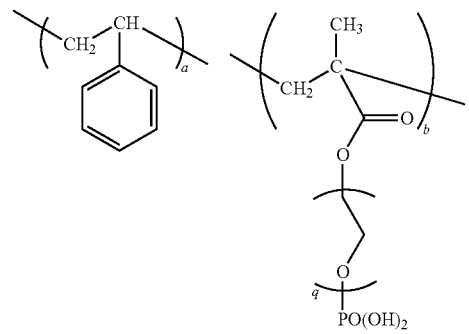

Mixture of $q = 4$ and $5$

B-3

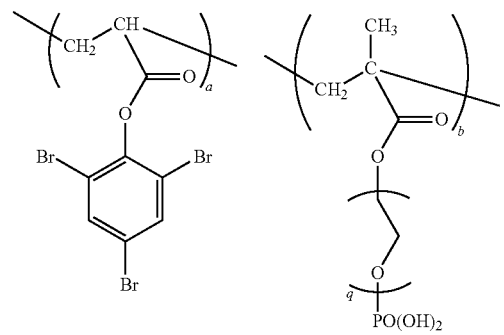

Mixture of $q = 4$ and $5$

B-4

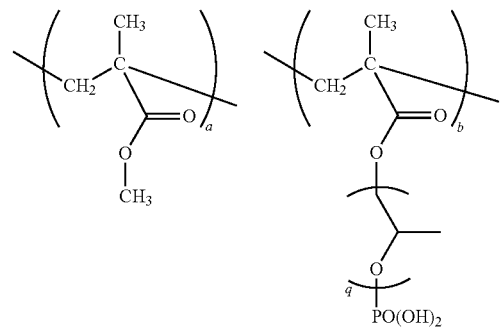

Mixture of $q = 5$ and $6$

B-5

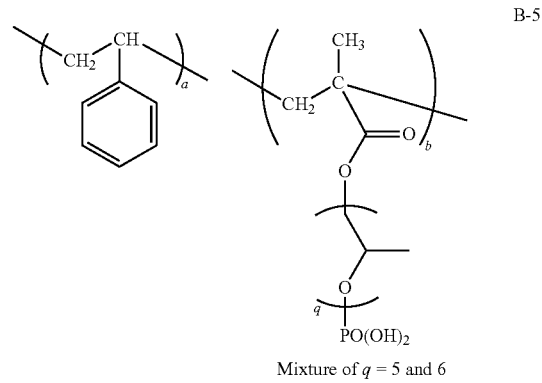

Mixture of $q = 5$ and $6$

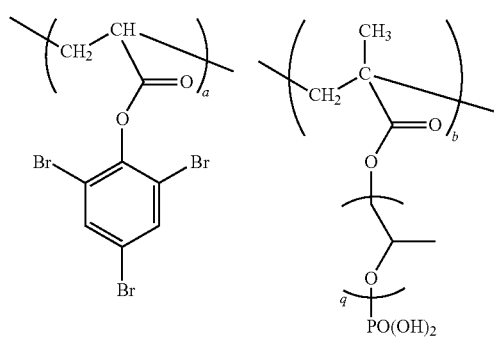 B-6
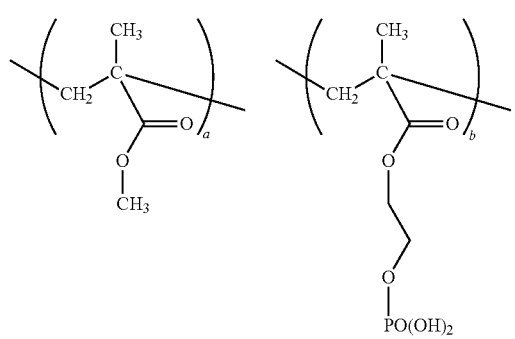 B-7
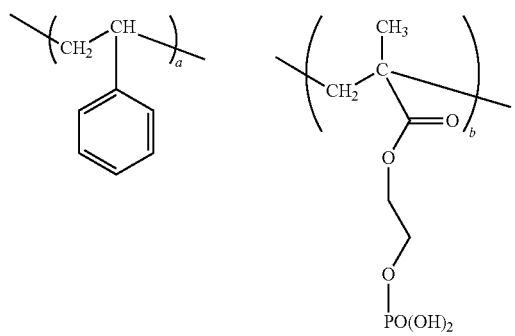 B-8
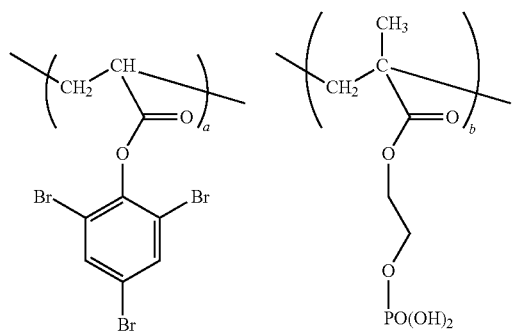 B-9
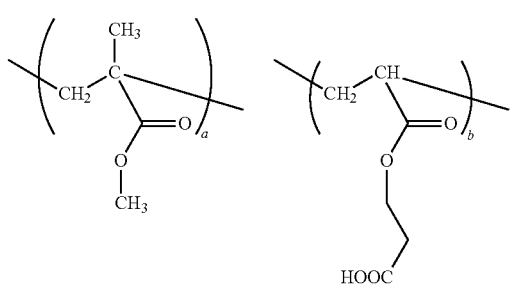 B-10
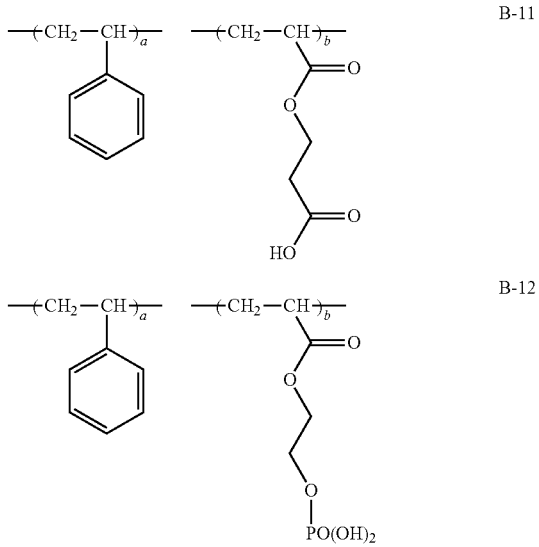
B-11
B-12
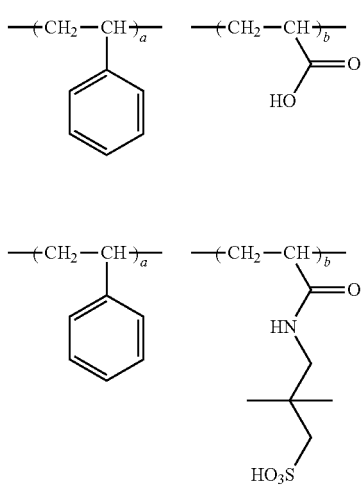
B-13
B-14
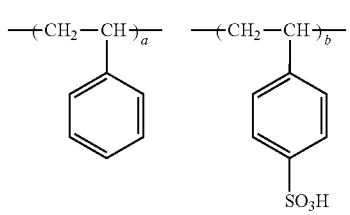 B-15

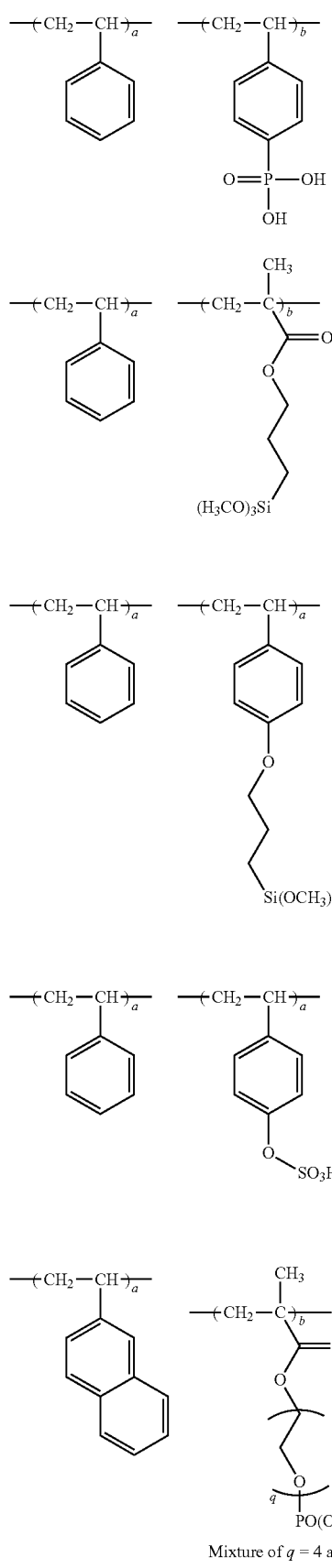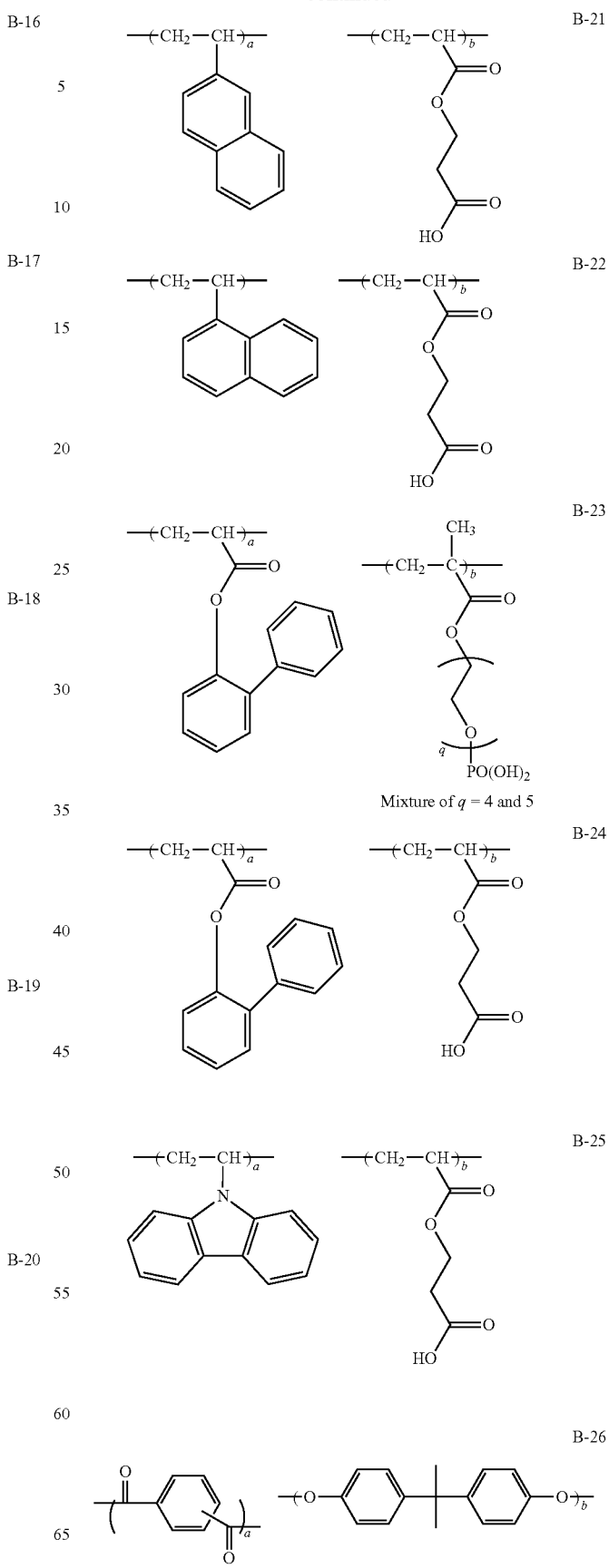

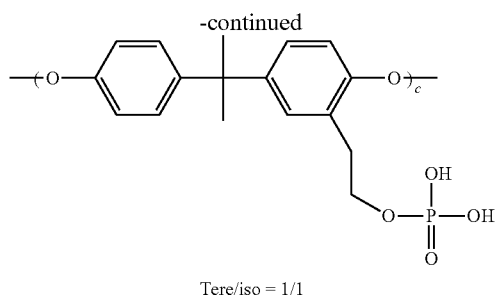

Tere/iso = 1/1

B-27

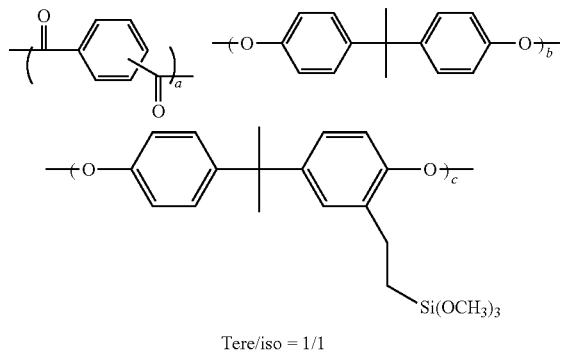

Tere/iso = 1/1

B-28

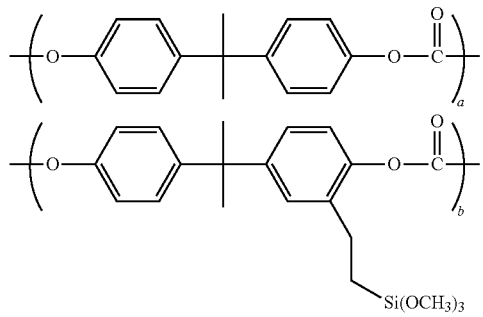

Those thermoplastic resins may be used alone or as mixtures of two or more thereof. The organic-inorganic hybrid composition of the invention may contain resins that do not satisfy the requirements of the invention, in addition to the thermoplastic resin satisfying the requirements of the invention. For example, a resin that does not have a functional group at the side chain and a thermoplastic resin satisfying the requirements of the invention may be mixed and used. The kind of a resin that does not have a functional group at an side chain is not particularly limited, but resins satisfying the optical properties, thermal properties and molecular weight as described before are preferable.

[Inorganic Fine Particles]

The inorganic fine particles used in the invention include oxide fine particles and sulfide fine particles. More specifically, the examples of the inorganic fine particles include zirconium oxide fine particles, zinc oxide fine particles, titanium oxide fine particles, tin oxide fine particles and zinc sulfide fine particles, but the inorganic fine particles are not limited to those. Of those, metal oxide fine particles are particularly preferable. Above all, anyone selected from the group consisting of zirconium oxide, zinc oxide, tin oxide and titanium oxide is preferable, any one selected from the group consisting of zirconium oxide, zinc oxide and titanium oxide is more preferable, and use of zirconium oxide fine particles having good visible region transparency and low photocatalyst activity are particularly preferable. In the invention, a composite of those inorganic materials may be used from the standpoints of refractive index, transparency and stability. Further, those fine particles may be particles which are doped with a different kind of an element, or whose surface layer is coated with a different kind of a metal oxide, such as silica or alumina, or is modified with a silane coupling agent, a titanate coupling agent or the like.

A method for producing the inorganic fine particles used in the invention is not particularly limited, and any conventional methods can be used. For example, the desired oxide fine particles can be obtained by using a metal halide or a metal alkoxide as a raw material, and hydrolyzing in a reaction system containing water.

Specifically, the following methods are known as a method of obtaining zirconium oxide fine particles or its suspension. A method of obtaining a zirconium oxide suspension by neutralizing an aqueous solution containing a zirconium salt with an alkali to obtain a hydrated zirconium, drying and burning the same, and then dispersing the same in a solvent; a method of obtaining a zirconium oxide suspension by hydrolyzing an aqueous solution containing a zirconium salt; a method of hydrolyzing an aqueous solution containing a zirconium salt to obtain a zirconium oxide suspension and then subjecting the same to ultrafiltration; a method of obtaining a zirconium oxide suspension by hydrolyzing a zirconium alkoxide; and a method of obtaining a zirconium oxide suspension by heat-treating an aqueous solution containing a zirconium salt under hydrothermal pressure. Any of those methods may be used.

Specifically, titanyl sulfate is exemplified as a raw material for the synthesis of titanium oxide nanoparticles, and a zinc salt such as zinc acetate and zinc nitrate is exemplified as a raw material for the synthesis of zinc oxide nanoparticles. Metal alkoxides such as tetraethoxysilane and titanium tetraisopropoxide are suitable as a raw material of the inorganic fine particles. A synthesis method of such inorganic fine particles includes a method described in, for example, Japanese Journal of Applied Physics, vol. 37, pages 4603-4608 (1998), or Langmuir, vol. 16, 1, pages 241-246 (2000) can be exemplified.

In particular, where oxide nanoparticles are synthesized from a sol formation method, it is possible to use a procedure of passing through a precursor such as a hydroxide, and then dehydrocondensing or deflocculating the same with an acid or an alkali, thereby forming a hydrogel, as in the synthesis of titanium oxide nanoparticles using titanyl sulfate as a raw material. In such a procedure of passing through a precursor, the precursor is isolated and purified with an optional method such as filtration and centrifugal separation, and this is preferable in the point of purity of a final product. An appropriate surfactant such as sodium dodecylbenzene sulfonate (abbreviated DBS) or dialkylsulfosuccinate monosodium salt (a product of Sanyo Chemical Industries, Ltd., trade name "ELEMINOL JS-2") may be added to the hydrogel obtained, thereby insolubilizing sol particles in water and isolating the same. For example, the method described in Color Material, vol. 57, 6, pages 305-308 (1984) can be used.

Further, a method of preparing inorganic fine particles in an organic solvent can be exemplified as a method other than the method of hydrolyzing in water. In this case, the thermoplastic resin used in the invention may be dissolved in an organic solvent.

Examples of the solvent used in those methods include acetone, 2-butanone, dichloromethane, chloroform, toluene, ethyl acetate, cyclohexanone and anisole. Those may be in one kind alone or as mixtures of two or more kinds thereof.

Where the number average particle size of the inorganic fine particles used in the invention is too small, there is the possibility that properties inherent in materials constituting the fine particles vary, and on the other hand, where it is too large, there is the possibility that influence of Rayleigh scattering is remarkable, and transparency of the organic-inorganic hybrid composition extremely deteriorates. Therefore, the lower limit of the number average particle size of the inorganic fine particles used in the invention is preferably 1 nm or more, more preferably 2 nm or more, and further preferably 3 nm or more, and the upper limit thereof is preferably 15 nm or less, more preferably 10 nm or less, and further preferably 5 nm or less. Specifically, the number average particle size of the inorganic fine particles used in the invention is preferably from 1 to 15 nm, more preferably 2 to 10 nm and further preferably from 3 to 5 nm.

The "number average particle size" used herein can be measured with, for example, X ray diffraction (XRD) or transmission electron microscope (TEM).

The inorganic fine particles used in the invention has a refractive index in a range of preferably from 1.9 to 3.0, more preferably from 2.0 to 2.7, and particularly preferably from 2.1 to 2.5, at a wavelength of 589 nm at 22° C. When the refractive index of the fine particles is 3.0 or less, difference in refractive index between the fine particles and the thermoplastic resin is not so large, and there is the tendency that it is liable to suppress Rayleigh scattering. Further, when the refractive index is 1.9 or more, there is the tendency that it is liable to achieve high refractive index.

The refractive index of the inorganic fine particles can be estimated by, for example, a method of measuring a refractive index of a composite as a transparent film, obtained by compositing the inorganic fine particles with the thermoplastic resin used in the invention with Abbe's refractometer (for example, DM-M4, a product of Atago) and converting the value from a refractive index of a resin component alone separately measured, or a method of measuring refractive indexes of dispersions of the fine particles, having different concentration, thereby calculating the refractive index of the fine particles.

The content of the inorganic fine particles in the organic-inorganic hybrid composition of the invention is preferably from 20 to 95% by mass, more preferably from 25 to 70% by mass, and particularly preferably from 30 to 60% by mass, from the standpoints of transparency and high refractive index. Further, the mass ratio of the inorganic fine particles to the thermoplastic resin (dispersed polymer) in the invention is preferably from 1:0.01 to 1:100, more preferably from 1:0.05 to 1:10, and particularly preferably from 1:0.05 to 1:5, from the point of dispersibility.

[Additives]

Other than the above-described thermoplastic resin and the inorganic fine particles, various additives may appropriately be blended with the organic-inorganic hybrid composition of the invention from the standpoints of uniform dispersibility, flowability when molding, release properties, weather resistance and the like.

The blending proportion of those additives varies depending on the purpose, but is preferably from 0 to 50% by mass, more preferably from 0 to 30% by mass, and particularly preferably from 0 to 20% by mass, based on the sum of the inorganic fine particles and the thermoplastic resin.

[Surface Treating Agent]

In the invention, in mixing the organic fine particles dispersed in water or an alcohol solvent with the thermoplastic resin as described hereinafter, a surface modifier of the fine particles, other than the above-described thermoplastic resin may be added according to various purposes such as the purpose of increasing extructability and replacement to an organic solvent, the purpose of increasing uniform dispersibility into the thermoplastic resin, the purpose of decreasing water absorption properties of the fine particles or the purpose of increasing weather resistance. The surface treating agent has a weight average molecular weight of preferably from 50 to 50,000, more preferably from 100 to 20,000, and further preferably from 200 to 10,000.

The surface treating agent preferably has the structure represented by the following formula (3).

$$A-B \qquad \text{Formula (3)}$$

wherein A represents a functional group capable of forming a chemical bond with the surface of the inorganic fine particles used in the invention, and B represents a monovalent group or polymer of from 1 to 30 carbon atoms having a compatibility or reactivity with a resin matrix comprising the thermoplastic resin used in the invention as a main component. The "chemical bond" used herein means a covalent bond, an ionic bond, a coordinate bond, a hydrogen bond or the like.

Preferable examples of the group represented by A are the same as exemplified as the functional groups of the thermoplastic resin used in the invention.

On the other hand, the chemical structure of the group represented by B is preferably the same as or similar to the chemical structure of the thermoplastic resin that is the main component of the resin matrix, from the standpoint of compatibility. In the invention, the chemical structure of B as well as the thermoplastic resin preferably has an aromatic ring particularly from the standpoint of achieving high refractive index.

Examples of the surface treating agent preferably used in the invention include p-octylbenzoic acid, p-propylbenzoic acid, acetic acid, propionic acid, cyclopentanecarboxylic acid, dibenzyl phosphate, monobenzyl phosphate, diphenyl phosphate, di-α-naphthyl phosphate, phenylphosphoric acid, phenylphosphoric acid monophenyl ester, KAYAMER PM-21 (trade name; a product of Nippon Kayaku Co., Ltd.), KAYAMER PM-2 (trade name, a product of Nippon Kayaku Co., Ltd.), benzenesulfonic acid, naphthalenesulfonic acid, paraoctylbenzenesulfonic acid, and silane coupling agents described in, for example, JP-A-5-221640, JP-A-9-100111 and JP-A-2002-187921. However, the surface treating agent is not limited to those.

Those surface treating agents may be used alone or as mixtures of tow or more thereof.

Those surface treating agents are added in a total amount of preferably from 0.01 to 2 times, more preferably from 0.03 to 1 time, and particularly preferably from 0.05 to 0.5 time, in terms of mass, the mass of the fine particles.

[Plasticizer]

Where the thermoplastic resin used in the invention has high glass transition temperature, molding of a composition may not always be easy. Therefore, a plasticizer may be used to decrease the molding temperature of the composition of the invention. The addition amount where the plasticizer is added is preferably from 1 to 50% by mass, more preferably from 2 to 30% by mass, and particularly preferably from 3 to 20% by mass, based on the mass of the sum of the organic-inorganic hybrid composition.

The plasticizer used in the invention is required to determine totally considering compatibility with a resin, weather resistance, plasticizing effect and the like. The optimum material cannot be completely determined because of depending on other composition. However, from the standpoint of refractive index, a material having an aromatic ring is preferable, and a material having a structure represented by the following formula (4) can be exemplified as the representative example.

Formula (4)

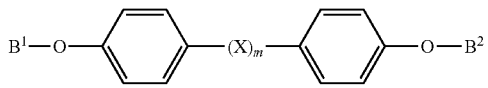

wherein $B^1$ and $B^2$ represent an alkyl group having from 6 to 18 carbon atoms or an allylalkyl group having from 6 to 18 carbon atoms, m is 0 or 1, X is one of

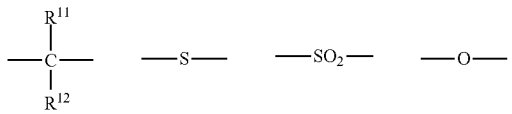

and $R^{11}$ and $R^{12}$ each independently represent a hydrogen atom or an alkyl group having 4 or less carbon atoms.

In the compound represented by the formula (4), $B^1$ and $B^2$ can select an optional alkyl group or allylalkyl group in a carbon atom range of from 6 to 18. Where the number of carbon atoms is less than 6, there is the case that the molecular weight is too low, so that such a compound boils at the melting temperature of a polymer, resulting in generation of bubbles. On the other hand, where the number of carbon atoms exceeds 18, there is the case that compatibility with a polymer deteriorates, resulting in insufficient addition effect.

Examples of $B^1$ and $B^2$ specifically include linear alkyl groups such as n-hexyl group, n-octyl group, n-decyl group, n-dodecyl group, n-tetradecyl group, n-hexadecyl group and n-octadecyl group; branched alkyl groups such as 2-hexyldecyl group and methyl-branched octadecyl group; and allylalkyl groups such as benzyl group and 2-phenylethyl group. Specific examples of the compound represented by the above formula (4) include the following compounds, and above all, W-1 (trade name: KP-L155, a product of Kao Corporation) is preferable.

W-1

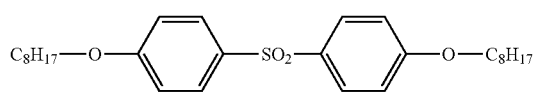

W-2

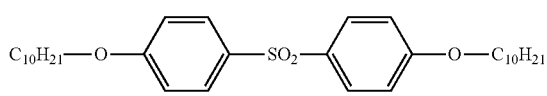

W-3

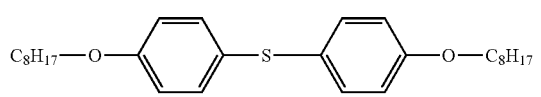

W-4

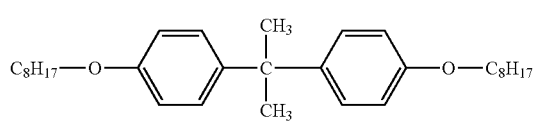

-continued

W-5

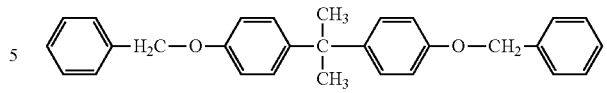

[Other Additives]

Other than the above components, the conventional release agents such as a modified silicone oil may be added for the purpose of improving moldability, and the conventional deterioration preventives such as hindered phenol type, amine type, phosphor type and thioether type may appropriately be added for the purpose of improving light resistance and thermal deterioration. Where those are added, the amount thereof is preferably from about 0.1 to 5% by mass based on the mass of the total solid content of the organic-inorganic hybrid composition.

[Production Method of Organic-Inorganic Hybrid Composition]

The inorganic fine particles used in the invention are dispersed in the resin in the form of chemical bonding with the thermoplastic resin having the above-described functional group at a side chain.

The inorganic fine particles used in the invention have small particle size and high surface energy. Therefore, where those are isolated as a solid, it is difficult to redisperse the same. Therefore, the inorganic fine particles are preferably mixed with the thermoplastic resin in the state of being dispersed in a solution to form a stable dispersant. Preferable production method of the composite includes (1) a method of producing a composite of inorganic fine particles and a thermoplastic resin, comprising subjecting the inorganic fine particles to a surface treatment in the presence of the above-described surface treating agent, extracting the surface-treated inorganic fine particles in an organic solvent, and uniformly mixing the extracted inorganic fine particles and the thermoplastic resin, and (2) a method of producing a composite of inorganic fine particles and a thermoplastic resin, comprising uniformly mixing the inorganic fine particles and the thermoplastic resin using a solvent that can uniformly disperse or dissolve those.

When the composite of inorganic fine particles and the thermoplastic resin is produced by the method (1) above, a water-insoluble solvent such as toluene, ethyl acetate, methyl isobutyl ketone, chloroform, dichloroethane, dichloromethane, chlorobenzene and methoxybenzene is used as an organic solvent. The surface treating agent used in extraction of the inorganic fine particles in an organic solvent and the thermoplastic resin may be the same kind or different kind. The surface treating agent preferably used includes the materials described in the item of the surface treating agent above.

In mixing the inorganic fine particles extracted in an organic solvent and the thermoplastic resin, additives such as plasticizers, release agents or different kind of polymers may be added, if required and necessary.

When the method (2) above is employed, a hydrophilic polar solvent such as dimethyl acetamide, dimethyl formamide, dimethyl sulfoxide, benzyl alcohol, cyclohexanol, ethylene glycol monomethyl ether, 1-methoxy-2-propanol, tert-butanol, acetic acid and propionic acid, alone or in a form of a mixed solvent thereof, or a mixed solvent of a water-insoluble solvent such as chloroform, dichloroethane, dichloromethane, ethyl acetate, methyl ethyl ketone, methyl isobutyl ketone, toluene, chlorobenzene and methoxybenzene, and the above-described polar solvent is preferably used. In this case, separately from the above-described thermoplastic resin, a dispersant, a plasticizer, a release agent or a different kind of a polymer may be added, if required and necessary. When the inorganic fine particles dispersed in water/methanol, it is preferable that a hydrophilic solvent having a boiling point higher than that of water/alcohol and dissolving the thermoplastic resin is added, and water/methanol are then concentrated and distilled away, thereby substituting the dispersion of the inorganic file particles with a polar organic solvent, followed by mixing with a resin. In this case, the surface treating agent described above may be added.

A solution of the organic-inorganic hybrid composition obtained by the methods (1) and (2) above can be cast molded to form a molding. However, it is particularly preferable in the invention that the solution is subjected to concentration, freeze drying, reprecipitation from an appropriate poor solvent, or the like to remove a solvent, and the powdered solid content is molded by a method such as injection molding or compression molding.

[Molding]

The molding of the invention can be produced by molding the organic-inorganic hybrid composition. It is useful for the molding of the invention to show the refractive index and optical properties described in the description of the organic-inorganic hybrid composition.

The molding of the invention preferably has the maximum thickness of 0.1 mm or more. The maximum thickness is preferably from 0.1 to 5 mm, and more preferably from 1 to 3 mm. The molding having such a thickness is particularly useful as an optical component having a high refractive index. Such a thick molding is generally difficult to produce by a solution casting method because a solvent is difficult to escape. However, when the organic-inorganic hybrid composition of the invention is used, molding is easy and complicated shape such as aspheric surface can easily be realized. Thus, according to the invention, a molding having good transparency can be obtained while utilizing high refractive index properties of fine particles.

[Optical Component]

The molding of the invention has high refraction properties, light transmission property and lightweight properties in combination, and is a molding having excellent optical properties. The optical component of the invention comprises such a molding. The kind of the optical component of the invention is not particularly limited. It particular, it can suitably be utilized as optical components utilizing excellent optical properties of the organic-inorganic hybrid composition of the invention, particularly optical components that transmit light (so-called passive optical components). Examples of an optically functional device provided with such an optical component include various display devices (liquid crystal display, plasma display and the like), various projector devices (OHP, liquid crystal projector and the like), optical fiber communication devices (optical waveguide, optical amplifier and the like), and photographic devices such as cameras and video.

Examples of the passive optical component used in an optically functional device include lenses, prisms, prism sheets, panels (plate-like molding), films, optical waveguides (film-like, fiber-like, etc.), optical discs, and encapsulants of LED. If required and necessary, such a passive optical component may be provided with an optional coating layer such as a protective layer that prevents mechanical damages by friction or abrasion, a light absorption layer that absorbs light having undesired wavelength causing deterioration of fine particles or a substrate, a transmission-blocking layer that suppresses or prevents transmission of reactive low molecules such as moisture or oxygen gas, an antiglare layer, an antireflective layer and a low refractive index layer; or an optional additional function layer, thereby forming a multilayered structure. Examples of such an optional coating layer include a transparent conductive layer or a gas barrier layer, comprising an inorganic oxide coating layer; and a gas barrier layer or a hard coat layer, comprising an organic material coating layer. The coating method can use the conventional coating methods such as a vacuum deposition method, a CVD method, a sputtering method, a dip coat method and a spin coat method.

The optical component using the organic-inorganic hybrid composition of the invention is particularly suitable to a lens substrate. The lens substrate produced using the organic-inorganic hybrid composition of the invention has high refraction properties, light transmission properties and lightweight properties in combination, and thus is excellent in optical properties. Further, it is possible to optionally adjust a refractive index of a lens substrate by appropriately adjusting the kind of monomers constituting the organic-inorganic hybrid composition and the amount of the inorganic fine particles dispersed.

The "lens substrate" used herein means a simple member that can exhibit lens function. A film or a member can be provided on the surface of or around the lens substrate according to use environment or the purpose of use of the lens. For example, a protective layer, an antireflective film, a hard coat layer or the like can be formed on the surface of the lens substrate. Further, the circumference of the lens substrate can be fitted in a substrate-holding frame or the like to fix. However, those films and frames are a member to be added to the lens substrate intended in the invention, and are distinguished from the lens substrate itself intended in the invention.

When the lens substrate of the invention is utilized as a lens, the lens substrate itself of the invention may be used as a lens, or a film or a frame is added to the lens substrate, and the assembly may be used as a lens. Kind and shape of a lens using the lens substrate of the invention is not particularly limited. The lens substrate of the invention is used in, for example, eyeglasses, lenses for optical instruments, lenses for optoelectronics, lenses for lasers, lenses for pickups, lenses for in-vehicle cameras, lenses for portable cameras, lenses for digital cameras, and lenses for OHP and microlens arrays.

EXAMPLES

The characteristics of the invention are described more specifically by referring to the following Examples. In the following Examples, the material used, its amount and ratio, the details of the treatment and the treatment process may be suitably modified or changed not overstepping the spirit and the scope of the invention. Accordingly, the invention should not be limited to the Examples mentioned below.

[Method for Analysis and Evaluation]

(1) X-Ray Diffraction (XRD) Spectrum Measurement:

Using RINT 1500, a product of Rigaku Corporation (X-ray source: copper Kα ray, wavelength: 1.5418 angstroms), a sample was measured at 23° C.

(2) Observation With Transmission Electron Microscope (TEM)

Using a transmission electron microscope H-9000 UHR Model, a product of Hitachi, Ltd. (accelerating voltage: 200 kV, degree of vacuum in observation: about $7.6 \times 10^{-9}$ Pa), a sample was observed.

(3) Measurement of Light Transmittance

A sample to be measured is molded to prepare a substrate having a thickness of 1.0 mm, and the substrate was measured with light having a wavelength of 589 nm using a UV-visible ray spectrometric device, UV-3100 (a product of Shimadzu Corporation).

(4) Measurement of Refractive Index

Using an Abbe's refractometer (DR-M4, a product of Atago), a sample was measured with light having a wavelength of 589 nm.

(5) Measurement of Molecular Weight

Number average molecular weight and weight average molecular weight is each a molecular weight in terms of polystyrene conversion by detection with a differential refractometer (solvent: tetrahydrofuran) using GPC analyzer using columns of TSK gel GMHxL, TSK gel G4000HxL and TSK gel G2000HxL, trade names, products of Tosoh Corporation.

[Preparation of Inorganic Fine Particle Dispersion]

(1) Preparation of Zirconium Oxide Aqueous Dispersion

A zirconium oxychloride solution having a concentration of 50 g/liter was neutralized with a 48% sodium hydroxide aqueous solution to obtain a hydrated zirconium suspension. The suspension was filtered, and a filter cake was washed with an ion-exchanged water to obtain a hydrated zirconium cake. This cake was dissolved in an ion-exchanged water as a solvent to prepare a solution having a concentration of 15% by mass in terms of zirconium oxide. The solution was placed in an autoclave, and hydrothermally treated at 150° C. under a pressure of 150 atmospheres for 24 hours to obtain a zirconium oxide fine particle suspension. TEM confirmed formation of zirconium oxide fine particles having a number average particle size of 5 nm.

(2) Preparation of Zirconium Oxide Toluene Dispersion (1)

100 g of the zirconium oxide fine particle suspension prepared in (1) above and a toluene solution of 3 g of KAYAMER PM-21, a product of Nippon Kayaku Co., Ltd., dissolved in 100 g of toluene were mixed, and then stirred at 30° C. for 8 hours. The toluene solution was extracted to adjust a concentration, thereby preparing a zirconium oxide fine particle toluene dispersion (15% by mass).

(3) Preparation of Zirconium Oxide Dimethylacetamide Dispersion (2)

500 g of N,N'-dimethylacetamide was added to 500 g of the zirconium oxide dispersion (15% by mass aqueous dispersion) prepared in (1) above, and the resulting mixture was concentrated to the amount of about 500 g or less under reduced pressure, followed by solvent substitution. N,N'-dimethylacetamide was added to adjust a concentration, thereby obtaining 15% by mass zirconium oxide dimethylacetamide dispersion (2).

[Synthesis of Thermoplastic Resin]

(1) Synthesis of Thermoplastic Resin (B-1)

0.05 g of PHOSMER PE (trade name), a product of Uni Chemical Co., Ltd., 4.95 g of methyl methacrylate and 0.25 g of azobisisobutyronitrile were added to 2-butanone, and polymerization was conducted at 70° C. under nitrogen to synthesize a thermoplastic resin (B-1).

As a result of measurement with GPC, the resin had a weight average molecular weight of 80,000. Further, the resin had a refractive index measured with Abbe refractometer of 1.49.

(2) Synthesis of Thermoplastic Resin (B-2)

0.05 g of PHOSMER PE (trade name), a product of Uni Chemical Co., Ltd., 4.95 g of styrene and 0.25 g of azobisisobutyronitrile were added to toluene, and polymerization was conducted at 70° C. under nitrogen to synthesize a thermoplastic resin (B-2).

As a result of measurement with GPC, the resin had a weight average molecular weight of 86,000. Further, the resin had a refractive index measured with Abbe refractometer of 1.58.

(3) Synthesis of Thermoplastic Resin (B-3)

0.05 g of PHOSMER PE (trade name), a product of Uni Chemical Co., Ltd., 4.95 g of NEW FRONTIER BR-30, a product of Dai-Ichi Kogyo Seiyaku Co., Ltd., and 0.25 g of azobisisobutyronitrile were added to toluene, and polymerization was conducted at 70° C. under nitrogen to synthesize a thermoplastic resin (B-3).

As a result of measurement with GPC, the resin had a weight average molecular weight of 90,000. Further, the resin had a refractive index measured with Abbe refractometer of 1.59.

(4) Synthesis of Thermoplastic Resin (B-11)

247.5 g of styrene, 2.50 g of carboxyethyl acrylate and 2.5 g of a polymerization initiator V-601 (trade name), a product of Wako Pure Chemical Industries, Ltd., were dissolved in 107.1 g of ethyl acetate, and polymerization was conducted at 80° C. under nitrogen to synthesize a thermoplastic resin (B-11). As a result of measurement with GPC, the resin had a weight average molecular weight of 35,000. Further, the resin had a refractive index measured with Abbe refractometer of 1.59.

Thermoplastic resins (B-11) having weight average molecular weights of 400,000 and 1,700 were synthesized in the same manner as above, except for changing a concentration of an initiator and an amount of a solvent. Those resins each had a refractive index of 1.59.

(5) Synthesis of Thermoplastic Resin (B-14)

247.5 g of styrene, 2.50 g of the functional group-containing monomer (A-6) and 2.5 g of a polymerization initiator V-601 (trade name), a product of Wako Pure Chemical Industries, Ltd., were dissolved in 107.1 g of ethyl acetate, and polymerization was conducted at 80° C. under nitrogen to synthesize a thermoplastic resin (B-14). As a result of measurement with GPC, the resin had a weight average molecular weight of 28,000. Further, the resin had a refractive index measured with Abbe refractometer of 1.59.

(6) Synthesis of Thermoplastic Resin (B-17)

247.5 g of styrene, 2.50 g of the functional group-containing monomer (A-9) and 2.5 g of a polymerization initiator V-601 (trade name), a product of Wako Pure Chemical Industries, Ltd., were dissolved in 107.1 g of ethyl acetate, and polymerization was conducted at 80° C. under nitrogen to synthesize a thermoplastic resin (B-17). As a result of measurement with GPC, the resin had a weight average molecular weight of 28,000. Further, the resin had a refractive index measured with Abbe refractometer of 1.59.

(7) Synthesis of Comparative Resin (P-1)

5.00 g of methyl methacrylate and 0.15 g of azobisisobutyronitrile were added to 2-butanone, and polymerization was conducted at 70° C. under nitrogen to synthesize a comparative resin P-1 not having a functional group bondable to fine particles at a side chain. As a result of measurement with GPC, the resin had a weight average molecular weight of 100,000. Further, the resin had a refractive index measured with Abbe refractometer of 1.49.

Comparative Resin (P-1)

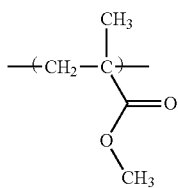

(8) Synthesis of Comparative Resin (P-2)

5.00 g of styrene and 0.15 g of azobisisobutyronitrile were added to toluene, and polymerization was conducted at 70° C. under nitrogen to synthesize a comparative resin (P-2) not having a functional group bondable to fine particles at a side chain. As a result of measurement with GPC, the resin had a weight average molecular weight of 105,000. Further, the resin had a refractive index measured with Abbe refractometer of 1.59.

Comparative Resin (P-2)

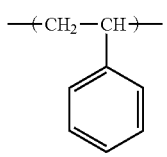

(9) Synthesis of Comparative Resin (P-3)

5.00 g of NEW FRONTIER BR-30, a product of Dai-Ichi Kogyo Seiyaku Industries, Ltd., and 0.15 g of azobisisobutyronitrile were added to toluene, and polymerization was conducted at 70° C. under nitrogen to synthesize a comparative resin (P-3) not having a functional group bondable to fine particles at a side chain. As a result of measurement with GPC, the resin had a weight average molecular weight of 11,000. Further, the resin had a refractive index measured with Abbe refractometer of 1.59.

Comparative Resin (P-3)

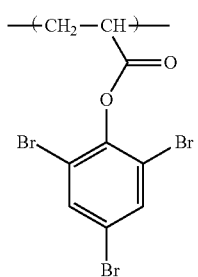

[Preparation of Inorganic-Organic Hybrid Composition and Production of Molding]

(1) Example 1

The thermoplastic resin B-1 was added to the zirconium oxide fine particle toluene dispersion (1) prepared above such that the $ZrO_2$ fine particles are 56% by mass of the solid content. After concentrating and distilling away a solvent, the concentrated residue was compression molded under heating (temperature: 180° C., pressure: 13.7 MPa, time: 2 minutes) to obtain a transparent molding having a thickness of 1 mm (lens substrate). The molding obtained in Example 1 was cut, and the cut cross section was observed with TEM. As a result, it was confirmed that the inorganic fine particles are uniformly dispersed in the resin. Further, light transmittance measurement and refractive index measurement were conducted. The results obtained are shown in Table 1 below.

(2) Examples 2 to 4

Organic-inorganic hybrid compositions and transparent moldings (lens substrates) were prepared in the same manner as in Example 1, except for changing the thermoplastic resin B-1 in Example 1 to thermoplastic resins B-2, 3 and 11, respectively. The respective moldings obtained in Example 2 to 4 were cut, and each cut cross section was observed with TEM. Further, light transmittance measurement and refractive index measurement were conducted. The results obtained are shown in Table 1 below.

(3) Example 5

The thermoplastic resin B-11, n-octylbenzoic acid and KP-L155 (trade name, a product of Kao Corporation) as a plasticizer were added to the zirconium oxide dimethylacetamide dispersion obtained above in a mass ratio of $ZrO_2$ solid content/B-11/n-octylbenzoic acid/KP-L155=35.7/42.9/7.1/14.3, and the resulting mixture was uniformly mixed by stirring. The dimethylacetamide solvent was concentrated under heating and reduced pressure. The resulting concentrated residue was compression molded under heating under the same conditions as in Example 1 to prepare a transparent molding (lens substrate). The molding obtained in Example 5 was cut, and the cut cross section was observed with TEM. Further, light transmittance measurement and refractive index measurement were conducted. The results obtained are shown in Table 1 below.

(4) Examples 6 and 7

Transparent moldings (lens substrates) of Examples 6 and 7 were prepared in the same manner as in Example 5, except for changing the thermoplastic resin B-11 in Example 5 to thermoplastic resins B-14 and B-17, respectively. The respective moldings obtained in Examples 6 and 7 were cut, and each cut cross section was observed with TEM. Further, light transmittance measurement and refractive index measurement were conducted. The results obtained are shown in Table 1 below.

(5) Example 8

The dimethylacetamide solution before concentration of the organic-inorganic hybrid composition described in Example 5 was introduced into a large excess of water to form a precipitate. The precipitate obtained was filtered off, and dried to obtain an organic-inorganic hybrid composition of Example 8. Using this organic-inorganic hybrid composition, a transparent molding (lens substrate) of Example 8 was obtained in the same manner as in Example 1. The transparent molding obtained of Example 8 was cut, and the cut cross section was observed with TEM. Further, light transmittance measurement and refractive index measurement were conducted. The results obtained are shown in Table 1 below.

(6) Example 9

Titanium oxide fine particles were synthesized according to the method described in Synthesis Example 9 of JP-A-

2003-73559. Formation of anatase titanium oxide fine particles (number average particle size is about 5 nm) was confirmed by X-ray diffraction (XRD) and transmission electron microscope (TEM). The titanium oxide fine particles were suspended in 1-butanol, followed by ultrasonic treatment for 30 minutes and then heating at 100° C. for 30 minutes. The white turbid liquid obtained was added dropwise to a chloroform solution of 10% by mass of the thermoplastic resin B-2 dissolved therein at ordinary temperature over 5 minutes while stirring such that the solid content of titanium oxide is 40% by mass of the total solid content. A solvent was distilled away from the mixed liquid obtained, and a concentrated residue was heat molded in the same manner as in Example 1 to obtain a transparent molding (lens substrate) having a thickness of 1 mm. The molding obtained was cut, and the cut cross section was observed with TEM. As a result, it was confirmed that the inorganic fine particles are uniformly dispersed in the resin. Further, light transmittance measurement and refractive index measurement were conducted. The results obtained are shown in Table 1 below.

(7) Comparative Example 1

A molding was prepared in the same manner as in Example 1, except for replacing the thermoplastic resin B-1 in Example 1 with the comparative resin P-1. The molding obtained was remarkably white turbid, and its refractive index could not be measured. The molding obtained was cut, and the cut cross section was observed with TEM. As a result, agglomeration of fine particles was recognized.

(8) Comparative Example 2

The titanium oxide fine particles synthesized in Example 10 were suspended in 1-butanol, followed by ultrasonic treatment for 30 minutes and then heating at 100° C. for 30 minutes. The white turbid liquid obtained was added dropwise to a chloroform solution of 10% by mass of P-1 dissolved therein at ordinary temperature over 5 minutes while stirring such that the solid content of titanium oxide is 40% by mass of the total solid content. A solvent was distilled away from the mixed liquid obtained, and using the residue obtained, a molding was prepared in the same manner as in Example 1. The molding obtained was cut, and the cut cross section was observed with TEM. As a result, agglomeration of the fine particles was recognized.

(9) Comparative Examples 3 and 4

Moldings of Comparative Examples 3 and 4 were prepared in the same manner as in Example 1, except for replacing the comparative resin P-1 of Comparative Example 1 with P-2 and P-3, respectively. Each molding obtained was cut, and each cut cross section was observed with TEM. As a result, it was confirmed in each molding that the resin and the fine particles are phase-separated, and fine particles are agglomerated. Each molding obtained was remarkably white turbid, and its refractive index could not be measured. Each molding was cut, and the cut cross section was observed with TEM. As a result, agglomeration of fine particles was recognized in each molding.

(10) Comparative Example 5

The following test was conducted similar to Examples 3 and 4 of JP-T-2004-524396. 20% by mass of aminopropyl trimethoxysilane was added to ethanol having the titanium oxide fine particles synthesized in Example 10 suspended therein. Similarly to JP-T-2004-524396, 10 parts by mass of surface-treated titanium oxide fine particles and 90 parts by mass of a polyacrylic acid (weight average molecular weight: 25,000, a product of Wako Pure Chemical Industries, Ltd.) were mixed in ethanol. A solvent was concentrated and distilled away to obtain a residue. Using the residue, a molding was prepared in the same manner as in Example 1. The molding obtained was remarkably white turbid, and its refractive index could not be measured. The molding was cut, and the cut cross section was observed with TEM. As a result, it was confirmed that the respective fine particles are not agglomerated, and are dispersed, but crude density unevenness is present.

(11) Comparative Examples 6 and 7

Example 5 was followed, except for replacing B-11 (weight average molecular weight/number average molecular weight: 35,000/200,000, average number of functional groups per one polymer chain: 4.39) with the thermoplastic resins B-11 in which the copolymerization ratio is the same (same acid value) and only a molecular weight is changed to change the average number of functional groups per one polymer chain (weight average molecular weight/number average molecular weight: 400,000/250,000 and 1,700/1,000, average number of functional groups per one polymer chain: 23.9 and 0.095). As a result, each molding obtained was remarkably white turbid, and its refractive index could not be measured. Each molding obtained was cut, and each cut cross section was observed with TEM. As a result, it was confirmed that in the resin having the average number of functional group of 23.9, fine particles are not agglomerated, and are dispersed, but crude density unevenness is present. Further, in the resin having the average number of functional group of 0.095, agglomeration of fine particles was confirmed.

TABLE 1

| | | Polymer of thermoplastic resin | | | | Inorganic fine particle | | |
| --- | --- | --- | --- | --- | --- | --- | --- | --- |
| | Kind of polymer | Weight average molecular weight | Number average molecular weight | Copolymerization ratio (mass ratio) | Average content of functional group * (/one polymer) | Kind | Refractive index | Content (mass %) |
| Example 1 | B-1 | 80000 | 45000 | 99/1 | 4.39 | $ZrO_2$ | 2.10 | 56 |
| Example 2 | B-2 | 86000 | 47000 | 99/1 | 4.37 | $ZrO_2$ | 2.10 | 56 |
| Example 3 | B-3 | 90000 | 45000 | 99/1 | 4.41 | $ZrO_2$ | 2.10 | 56 |
| Example 4 | B-11 | 35000 | 20000 | 99/1 | 4.39 | $ZrO_2$ | 2.10 | 56 |
| Example 5 | B-11 | 35000 | 20000 | 99/1 | 4.39 | $ZrO_2$ | 2.10 | 35.7 |

TABLE 1-continued

| | | | | | | | | |
|---|---|---|---|---|---|---|---|---|
| Example 6 | B-14 | 28000 | 16000 | 99/1 | 1.17 | $ZrO_2$ | 2.10 | 35.7 |
| Example 7 | B-17 | 28000 | 17000 | 99/1 | 1.91 | $ZrO_2$ | 2.10 | 35.7 |
| Example 8 | B-11 | 35000 | 20000 | 99/1 | 4.39 | $ZrO_2$ | 2.10 | 35.7 |
| Example 9 | B-2 | 86000 | 47000 | 99/1 | 4.37 | $TiO_2$ | 2.40 | 40 |
| Comparative Example 1 | P-1 | 100000 | 60000 | 100/0 | 0 | $ZrO_2$ | 2.10 | 56 |
| Comparative Example 2 | P-1 | 100000 | 60000 | 100/0 | 0 | $TiO_2$ | 2.40 | 40 |
| Comparative Example 3 | P-2 | 105000 | 62000 | 100/0 | 0 | $ZrO_2$ | 2.10 | 56 |
| Comparative Example 4 | P-3 | 110000 | 65000 | 100/0 | 0 | $ZrO_2$ | 2.10 | 56 |
| Comparative Example 5 | Polyacrylic acid | 25000 | 15000 | 0/100 | 208.16 | $TiO_2$ | 2.40 | 10 |
| Comparative Example 6 | B-11 | 400000 | 250000 | 99/1 | 23.9 | $ZrO_2$ | 2.10 | 35.7 |
| Comparative Example 7 | B-11 | 1700 | 1000 | 99/1 | 0.095 | $ZrO_2$ | 2.10 | 35.7 |

| | Evaluation | | |
|---|---|---|---|
| | Dispersibility of inorganic fine particle | Transmittance at 589 nm | Refractive index |
| Example 1 | Uniformly dispersed in resin | 89 | 1.60 |
| Example 2 | Uniformly dispersed in resin | 86 | 1.69 |
| Example 3 | Uniformly dispersed in resin | 87 | 1.68 |
| Example 4 | Uniformly dispersed in resin | 87 | 1.69 |
| Example 5 | Uniformly dispersed in resin | 86 | 1.63 |
| Example 6 | Uniformly dispersed in resin | 87 | 1.63 |
| Example 7 | Uniformly dispersed in resin | 88 | 1.63 |
| Example 8 | Uniformly dispersed in resin | 86 | 1.63 |
| Example 9 | Uniformly dispersed in resin | 83 | 1.72 |
| Comparative Example 1 | Agglomeration | 0 (white turbid) | — |
| Comparative Example 2 | Agglomeration | 0 (white turbid) | — |
| Comparative Example 3 | Agglomeration | 0 (white turbid) | — |
| Comparative Example 4 | Agglomeration | 0 (white turbid) | — |
| Comparative Example 5 | Particle density unevenness | 0 (white turbid) | — |
| Comparative Example 6 | Particle density unevenness | 0 (white turbid) | — |
| Comparative Example 7 | Agglomeration | 0 (white turbid) | — |

*Average content of functional group shows an average value of fine particle-bondable functional groups per one polymer chain It is seen from Table 1 that the fine particle-containing transparent moldings of the invention have high refractive index, further show good transparency even in thick moldings having a thickness of 1 mm, and therefore can be suitably used to optical applications.

Further, it was confirmed that the organic-inorganic hybrid composition mainly comprising a thermoplastic resin, of the invention can precisely form a lens shape in conformity with a shape of a mold with good productivity.

INDUSTRIAL APPLICABILITY

The lens substrate as the optical component of the invention contains an organic-inorganic hybrid composition having light transmission properties and lightweight properties in combination. According to the invention, a lens having optionally adjusted refractive index can easily be provided. Further, a lens having good mechanical strength and heat resistance is also easily provided. Therefore, the invention is useful to provide an optical component in a wide range such as a lens with a high refractive index, and has high industrial applicability.

The invention claimed is:

1. An organic-inorganic hybrid composition comprising inorganic fine particles and a thermoplastic resin having a functional group capable of forming a chemical bond with the inorganic fine particles at a side chain thereof, the composition having a refractive index of 1.60 or more at a wavelength of 589 nm and a light transmittance of 70% or more at a wavelength of 589 nm in terms of the composition having a thickness of 1 mm, and the functional group of the thermoplastic resin being selected from the group consisting of

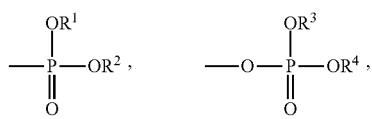

and —$SO_3H$, wherein $R^1$, $R^2$, $R^3$ and $R^4$ each independently represents a hydrogen atom, a substituted or unsubstituted alkyl group, a substituted or unsubstituted alkenyl group, a substituted or unsubstituted alkynyl group or a substituted or unsubstituted aryl group.

2. The organic-inorganic hybrid composition according to claim 1, wherein the functional group is contained in a range of from 0.1 to 20 on the average per one polymer chain of the thermoplastic resin.

3. The organic-inorganic hybrid composition according to claim 1, wherein the thermoplastic resin is a copolymer containing a repeating unit represented by the following formula (1):

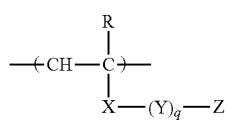

Formula (1)

wherein R represents a hydrogen atom, a halogen atom or a methyl group; X represents a divalent linking group selected from —$CO_2$—, —OCO—, —CONH—, —OCONH—, —OCOO—, —O—, —S—, —NH— and a substituted or unsubstituted arylene group; Y represents a divalent linking group having from 1 to 30 carbon atoms; q is an integer of from 0 to 18; Z represents a functional group selected from the group consisting of

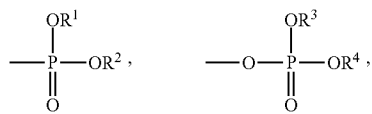

and —$SO_3H$, wherein $R^1$, $R^2$, $R^3$, and $R^4$, each independently represents a hydrogen atom, a substituted or unsubstituted alkyl group, a substituted or unsubstituted alkenyl group, a substituted or unsubstituted alkynyl group, or a substituted or unsubstituted aryl group.

4. The organic-inorganic hybrid composition according to claim 1, wherein the thermoplastic resin has a weight average molecular weight of from 1,000 to 500,000.

5. The organic-inorganic hybrid composition according to claim 1, wherein the thermoplastic resin has a refractive index of 1.55 or more.

6. The organic-inorganic hybrid composition according to claim 1, wherein the inorganic fine particles are metal oxide fine particles having a refractive index of from 1.9 to 3.0 at a wavelength of 589 nm.

7. The organic-inorganic hybrid composition according to claim 1, wherein the inorganic fine particles contain zirconium oxide, zinc oxide or titanium oxide.

8. The organic-inorganic hybrid composition according to claim 1, wherein the inorganic fine particles have a number average particle size of from 1 to 15 nm.

9. The organic-inorganic hybrid composition according to claim 1, wherein the inorganic fine particles are contained in an amount of 20% by mass or more.

10. The organic-inorganic hybrid composition according to claim 1, which is thermoplastic.

11. The organic-inorganic hybrid composition according to claim 1, which is a solvent-free solid.

12. A method for producing an organic-inorganic hybrid composition, comprising mixing a thermoplastic resin having at a side chain thereof a functional group selected from the group consisting of

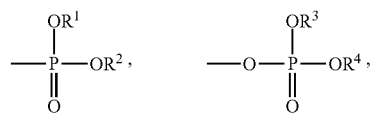

and —$SO_3H$, wherein $R^1$, $R^2$, $R^3$, and $R^4$ each independently represents a hydrogen atom, a substituted or unsubstituted alkyl group, a substituted or unsubstituted alkenyl group, a substituted or unsubstituted alkynyl group, or a substituted or unsubstituted aryl group, and m is an integer of 1 to 3;

and inorganic fine particles in an organic solvent.

13. The method for producing an organic-inorganic hybrid composition according to claim 12, which comprises subjecting the inorganic fine particles to surface treatment in water, an alcohol or a mixture of water and an alcohol in the presence of a surface-treating agent, extracting the surface-treated inorganic fine particles in an organic solvent, and mixing the extracted inorganic fine particles and the thermoplastic resin having the functional group at a side chain thereof.

14. The method for producing an organic-inorganic hybrid composition according to claim 12, which comprises mixing an organic solvent dispersion of the inorganic fine particles and the thermoplastic resin having the functional group at a side chain thereof, and distilling away a solvent from the resulting mixed liquid.

15. The method for producing an organic-inorganic hybrid composition according to claim 12, which comprises mixing an organic solvent dispersion of the inorganic fine particles and the thermoplastic resin having the functional group at a side chain thereof, and a step of reprecipitating the mixed liquid.

16. An organic-inorganic hybrid composition produced by the production method according to claim 12.

17. A molding comprising the organic-inorganic hybrid composition according to claim 1.

18. The molding according to claim 17 having a maximum thickness of 0.1 mm or more.

19. An optical component comprising the molding according to claim 17.

20. The optical component according to claim 19, which is a lens substrate.

21. An organic-inorganic hybrid composition comprising inorganic fine particles and a thermoplastic resin having a functional group capable of forming a chemical bond with the inorganic fine particles at a side chain thereof, the composition having a refractive index of 1.60 or more at a wavelength of 589 nm and a light transmittance of 70% or more at a wavelength of 589 nm in terms of the composition having a thickness of 1 mm, and the functional group of the thermoplastic resin being selected from the group consisting of

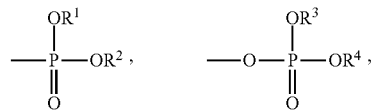

—$SO_3H$, —$OSO_3H$, —$CO_2H$, —OH, —$NH_2$, and —SH, wherein $R^1$, $R^2$, $R^3$ and $R^4$ each independently represents a hydrogen atom, a substituted or unsubstituted alkyl group, a substituted or unsubstituted alkenyl group, a substituted or unsubstituted alkynyl group or a substituted or unsubstituted aryl group,
wherein the functional group is contained in a range of from 0.1 to 20 on the average per one polymer chain of the thermoplastic resin.

22. An organic-inorganic hybrid composition comprising inorganic fine particles and a thermoplastic resin having a functional group capable of forming a chemical bond with the inorganic fine particles at a side chain thereof,
the composition having a refractive index of 1.60 or more at a wavelength of 589 nm and a light transmittance of 70% or more at a wavelength of 589 nm in terms of the composition having a thickness of 1 mm, and
the thermoplastic resin being a copolymer containing a repeating unit represented by the following formula (1):

Formula (1)

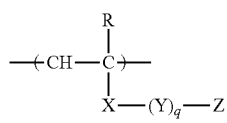

wherein R represents a hydrogen atom, a halogen atom or a methyl group; X represents a divalent linking group selected from —$CO_2$—, —OCO—, —CONH—, —OCONH—, —O—, —S—, —NH— and a substituted or unsubstituted arylene group; Y represents a divalent linking group having from 1 to 30 carbon atoms; q is an integer of from 0 to 18; Z represents a functional group selected from the group consisting of

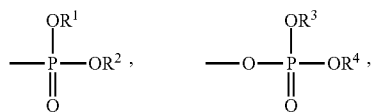

—$SO_3H$, and —$CO_2H$ wherein $R^1$, $R^2$, $R^3$, and $R^4$ each independently represents a hydrogen atom, a substituted or unsubstituted alkyl group, a substituted or unsubstituted alkenyl group, a substituted or unsubstituted alkynyl group, or a substituted or unsubstituted aryl group.

23. The organic-inorganic hybrid composition according to claim 21, wherein the thermoplastic resin is a copolymer containing a repeating unit represented by the following formula (1):

Formula (1)

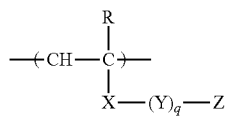

wherein R represents a hydrogen atom, a halogen atom or a methyl group; X represents a divalent linking group selected from —$CO_2$—, —OCO—, —CONH—, —OCONH—, —OCOO—, —O—, —S—, —NH— and a substituted or unsubstituted arylene group; Y represents a divalent linking group having from 1 to 30 carbon atoms; q is an integer of from 0 to 18; Z represents a functional group selected from the group consisting of

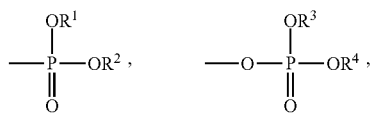

—$SO_3H$, and —$CO_2H$, wherein $R^1$, $R^2$, $R^3$, and $R^4$ each independently represents a hydrogen atom, a substituted or unsubstituted alkyl group, a substituted or unsubstituted alkenyl group, a substituted or unsubstituted alkynyl group, or a substituted or unsubstituted aryl group.

24. The organic-inorganic hybrid composition according to claim 21, wherein the thermoplastic resin has a weight average molecular weight of from 1,000 to 500,000.

25. The organic-inorganic hybrid composition according to claim 21, wherein the thermoplastic resin has a refractive index of 1.55 or more.

26. The organic-inorganic hybrid composition according to claim 21, wherein the inorganic fine particles are metal oxide fine particles having a refractive index of from 1.9 to 3.0 at a wavelength of 589 nm.

27. The organic-inorganic hybrid composition according to claim 21, wherein the inorganic fine particles contain zirconium oxide, zinc oxide or titanium oxide.

28. The organic-inorganic hybrid composition according to claim 21, wherein the inorganic fine particles have a number average particle size of from 1 to 15 nm.

29. The organic-inorganic hybrid composition according to claim 21, wherein the inorganic fine particles are contained in an amount of 20% by mass or more.

30. The organic-inorganic hybrid composition according to claim 21, which is thermoplastic.

31. The organic-inorganic hybrid composition according to claim 22, wherein the thermoplastic resin has a weight average molecular weight of from 1,000 to 500,000.

32. The organic-inorganic hybrid composition according to claim 22, wherein the thermoplastic resin has a refractive index of 1.55 or more.

33. The organic-inorganic hybrid composition according to claim 22, wherein the inorganic fine particles are metal oxide fine particles having a refractive index of from 1.9 to 3.0 at a wavelength of 589 nm.

34. The organic-inorganic hybrid composition according to claim 22, wherein the inorganic fine particles contain zirconium oxide, zinc oxide or titanium oxide.

35. The organic-inorganic hybrid composition according to claim 22, wherein the inorganic fine particles have a number average particle size of from 1 to 15 nm.

36. The organic-inorganic hybrid composition according to claim 22, wherein the inorganic fine particles are contained in an amount of 20% by mass or more.

37. The organic-inorganic hybrid composition according to claim 22, which is thermoplastic.

* * * * *